Feb. 20, 1934. J. S. PERESS 1,947,657
HYDRAULIC JOINT PARTICULARLY SUITABLE FOR DIVING DRESSES OR APPARATUS
Filed Aug. 7, 1933 2 Sheets-Sheet 2

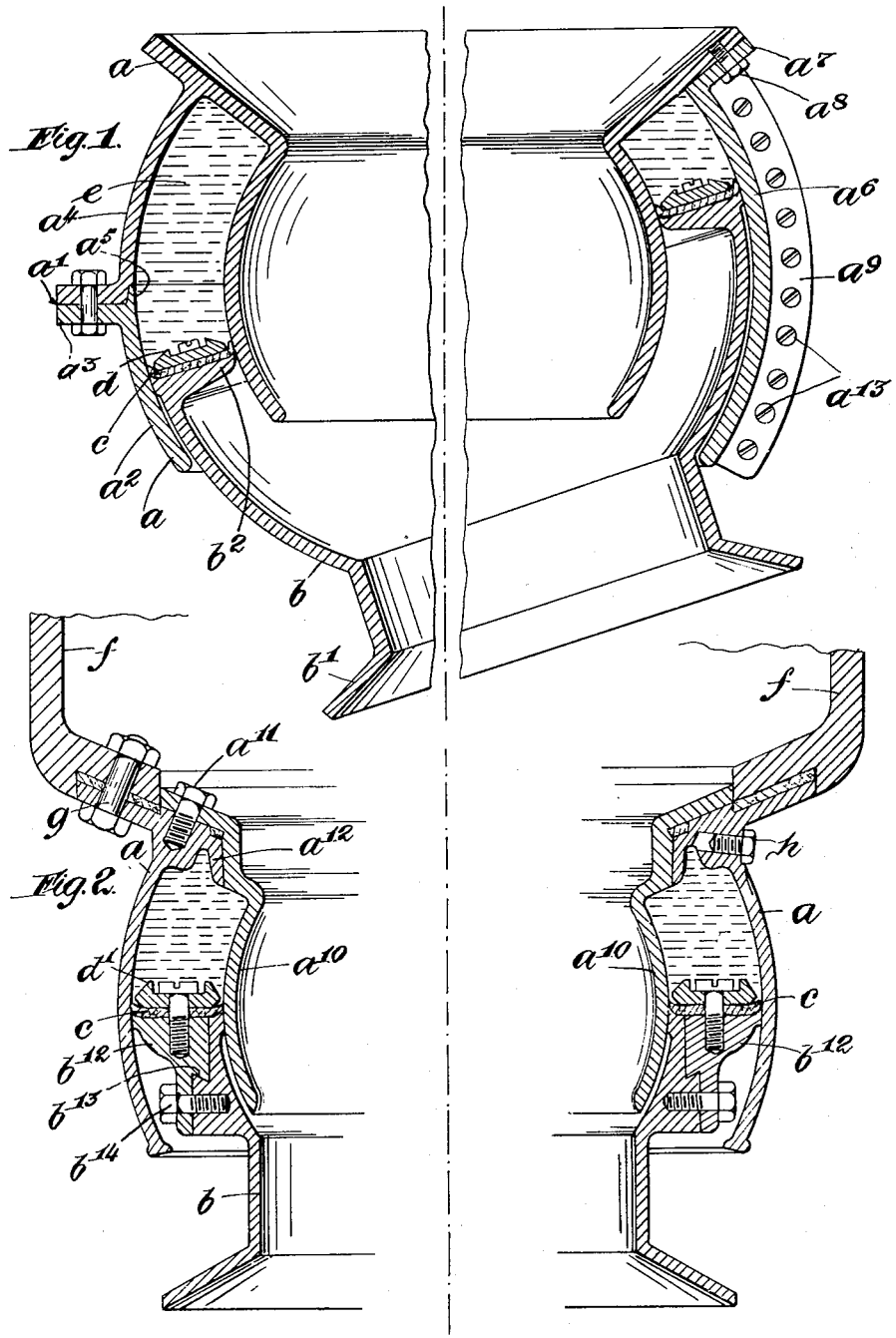

Inventor
Joseph S. Peress,
By Sommers & Young
Attys.

Patented Feb. 20, 1934

1,947,657

UNITED STATES PATENT OFFICE 1,947,657

HYDRAULIC JOINT PARTICULARLY SUITABLE FOR DIVING DRESSES OR APPARATUS

Joseph Salim Peress, Byfleet, England, assignor to Argonaut Corporation Limited, London, England, a company of Great Britain Application August 7, 1933, Serial No. 684,077, and in Great Britain August 16, 1932

14 Claims. (Cl. 285—91)

This invention comprises improvements in and connected with hydraulic joints particularly suitable for diving dresses or diving apparatus. The specification of Patent No. 1402645 describes flexible joints for diving dresses comprising, between the relatively movable parts of a joint, a fluid cushion or support which is incompressible but readily displaceable to permit of the movements of the articulated parts. In the particular example illustrated in that specification, one of the joint members was hemi-spherical and double walled so as to enclose an annular space or chamber for receiving the single hemi-spherical wall of the other joint member and flexible means were connected between the members for confining a sealing or jointing liquid within such space or chamber. The principal object of the present invention is to provide an improved construction of this kind of joint. In the first place, a more reliable and lasting joint is provided by avoiding the use of flexible means connected between the joint parts and enclosing liquid, and employing in its place a packing of a kind employed for hydraulic plungers. In the second place, it is desirable that the double walled joint part should be more than hemi-spherical or that its annular orifice should not lie about in a diametral plane or section of a sphere but should be disposed beyond such plane. Such a construction allows of more favourable articulation movements of the joint parts than is the case when both of such parts are of a hemispherical formation. It also enables articulation movements of maximum degree to be performed without any possibility of any portion of the perimeter of the single walled joint part emerging from the chamber enclosed by the double walls of the other part. This construction, however, must be devised and adapted so that the joint parts can be reliably assembled.

According to these improvements the annulus of the single-walled or male joint part is fitted with an annular hydraulic packing of the U-leather variety. The male joint part thus works as an annular piston and may have universal movement in the annular spherical chamber enclosed between the double walls of the other part, the said packing working over the two wall surfaces of such other part and preventing escape of the sealing liquid with which such chamber is filled. A joint when submerged is subjected to a crushing stress equal to the product of its greatest cross sectional area and the pressure per square inch due to its submergence. This total pressure however, is applied to an annulus of liquid lying within such area. Thus, whenever the joint is submerged, the sealing liquid is at a pressure which is greater than that of the surrounding water whereby the hydraulic packing is spread by such internal pressure so that the hydraulic jointing becomes tighter as the depth of submergence is increased.

According to a further part of these improvements, the double-walled or female member of the joint is of a truncated spherical shape, the sphere being truncated at diametrically opposite points or poles, so that the said member may be said to comprise a middle annular section of a sphere. The male member being advantageously of hemispherical form, it is necessary to make provision for effecting the entry or engagement of the male member into or with the female member. For this purpose, the female member is made with detachable parts which are adapted for being strongly and tightly bolted or connected together after the male member has been engaged with the main portion of the female member.

In order to enable this invention to be readily understood, reference is made to the accompanying drawings illustrating suitable examples of practical constructions in which drawings:—

Figure 1 is a central vertical section of a spherical joint embodying these improvements the construction of the female part illustrated to the left of the vertical centre line being different from that illustrated to the right of the centre line.

Figure 2 is a central vertical section of a modified construction.

Figure 3:
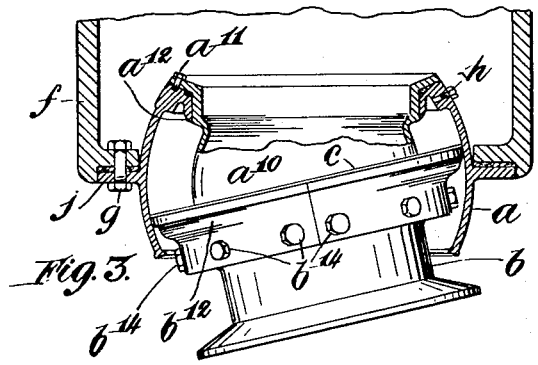
Figures 3 and 4 are sectional elevations to a smaller scale of further modifications.

Referring to Figure 1, the spherical joint therein illustrated comprises a double-walled or female part $a$ and a single-walled or male part $b$. This joint in a diving dress would be suitable for a knee joint, in which case the upper leg casing part would be attached to the part $a$ and the lower leg casing part would be attached to the extension $b^1$ of the male part $b$. As will be observed, the male part $b$ is of a truncated hemispherical shape, whereas the spherical walls of the female part $a$ have the shape of a sphere truncated at diametrically opposite points or poles, so that they may be said to be middle annular sections of spheres. The hemispherical male part $b$ is formed with a flange or head $b^2$ which works in a piston-like manner between the two walls of the part $a$. A hydraulic packing ring $c$ is fastened down upon the head $b^2$ by a securing ring $d$, the lips of the packing ring being presented inwardly or away from the open annular mouth of the chamber enclosed by the double walls of the female part and towards a charge of liquid $e$ which is introduced by suitable means into such chamber. As the full diameter across the piston head $b^2$ is greater than the full diameter across the annular mouth of the chamber in which such piston head works, it is necessary to make provision whereby the said piston head can be introduced into the chamber. Such provision consists, in the example illustrated in Figure 1, in making the outer wall of the annular chamber partly or wholly detachable. To the left hand of the vertical centre-line in Figure 1, the said outer wall is divided at $a^1$ on a horizontal plane passing through the centre of the sphere the lower part $a^2$ of the wall being flanged at $a^3$ and bolted to the flanged bottom edge of the upper part $a^4$ of such wall. These wall parts make a lap joint at $a^5$ to ensure fluid tightness. To the right hand of the said centre line, the outer wall part $a^6$ is wholly detachable and is flanged at $a^7$ so that it can be attached by screws or bolts $a^8$ to the body of the female part $a$, as shown. Moreover, the outer wall part $a^6$ is divided into two or more halves or segments, such halves or segments being flanged at $a^9$ so that they can be attached to one another in a fluid-tight manner by means of screws or bolts $a^{13}$, as will be readily understood.

In order to assemble the parts and compose the joint seen in Figure 1, the wall part $a^2$, or the wall $a^6$ must be detached. The male part $b$ is then applied to the inner spherical wall of the female member $a$ care being taken to see that the inner lip of the packing ring is properly disposed. The outer wall part $a^2$ is then applied and bolted to the part $a^4$, or the outer wall $a^6$ is applied and bolted in position, as will be readily understood. A charge of liquid $e$, such as oil or glycerine, is then introduced into the chamber by suitable means, such as a plugged charging hole, to fill the space between the piston head $b^2$ and the end wall of the annular chamber. The parts $b$ and $a$ can now move universally in relation to one another, the liquid charge being displaced from one part of the annular chamber to another during such movements. When the joint is submerged, pressure corresponding with the depth of submergence is exerted on the joint part in all directions. In the direction of the centre line of Figure 1, such pressure is exerted over the circuar area of a central section of the spherical joint. The total stress, which is a product of this pressure and area is applied by the annular piston head $b^2$ to an annular area of liquid forming a part only of the circular area previously referred to. Consequently, the liquid $e$ attains a greater pressure than the external pressure due to submergence with the consequence that the packing $c$ becomes tighter as the depth of submergence is increased and prevents any leakage of the external water to the interior of the joint of the diving suit or apparatus.

According to the modification illustrated in Figure 2, the female part $a$ comprises a one-piece outer spherical wall which is flanged for bolting to the diving suit or apparatus $f$ by means of bolts $g$. The male part $b$ is constructed so as to be adapted for the attachment of a divided seating ring $b^{12}$ which constitutes the principal portion of what has been termed the piston head. The packing ring $c$ is fastened down upon the ring $b^{12}$ by means of a securing ring $d^1$ which also is divided. The inner spherical wall $a^{10}$ of the female part is inserted into the latter from above and is secured therein by means of bolts $a^{11}$. Preferably the female part is formed with an inwardly projecting lip $a^{12}$ formed with a coned seating surface for engaging with a similarly coned surface on the inner wall $a^{10}$, whereby the latter is accurately centred and rigidly seated in a concentric position. The divided ring $b^{12}$ may be formed so as to have a half-dovetail engagement at $b^{13}$ with a thickened portion of the male part $b$. This engagement ensures an accurate drawing up and seating of the ring parts when the bolts or screws $b^{14}$ are tightened. The half-dovetail engagement also makes for a water-tight connection between the ring and the male part $b$, although water-tightness is actually secured by the packing ring $c$ seating itself over the joint between the ring $b^{12}$ and the male part $b$.

With the construction in Figure 2, the inner wall $a^{10}$ is absent from the female member $a$ and the seating ring $b^{12}$ is absent from the male member $b$ when the latter is introduced into the space enclosed by the outer wall of the member $a$. The seating ring parts are then applied and fastened to the male member $b$, the latter being tilted first to one side and then the other to enable the ring parts to be fitted on and secured by the bolts $b^{14}$. The packing ring $c$ is then inserted and fastened down upon the seating ring by means of the securing ring $d^1$ which is introduced in segments and fastened by the screws illustrated. Access is had for the performance of this operation through the open upper end of the joint. Finally, the inner wall part $a^{10}$ is inserted, concentrically seated and bolted down, the sealing liquid being appropriately introduced through a charging opening which is afterwards closed by the insertion of a screw plug $h$. It will be observed that the piston head and packing ring are situated approximately in a diametral plane of the spherical female member $a$. Thus in the event of end play the packing ring works between substantially parallel parts of the walls of the female member, thereby avoiding leakage of the sealing fluid.

The construction illustrated in Figure 3 is very similar to that illustrated in Figure 2, the principal difference being that the outer wall of the female member $a$ is attached to the submersible apparatus $f$ by means of a flange $j$ which is formed at about the middle of its depth instead of at the top edge as in Figure 2. From Figure 3 it will be understood how the divided seating ring parts can be fitted and bolted to the male part $b$ whilst the latter is tilted to one side or another.

Figure 4:
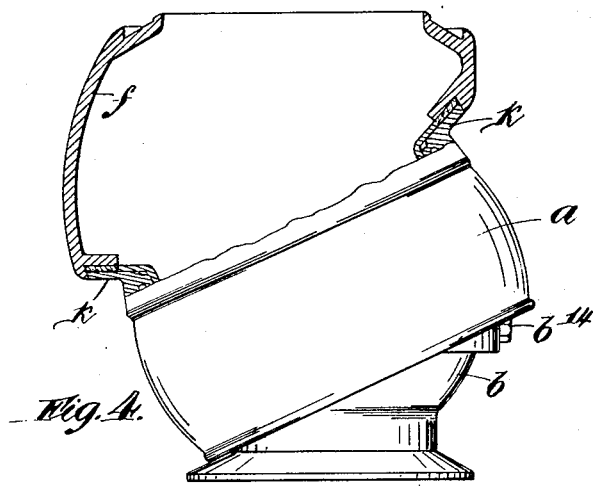

The construction in Figure 4 is very similar to that illustrated in Figure 2, the difference being that in Figure 4 the female part $a$ is formed with a shaped attachment flange $k$ whereby it can be attached to the submersible apparatus $f$ at an angle from the horizontal as shown. This would suit a body joint for example, which is not required to flex forwards but only backwards or sidewards.

Figure 5:
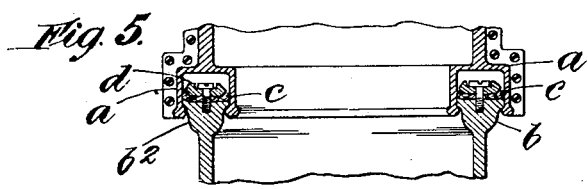
Figure 5 is a central vertical section of a revoluble cylindrical joint embodying these improvements.

Figure 5 illustrates these improvements applied to a cylindrical joint in which the male member $b$ is required only to have a movement of revolution in relation to the female member $a$. As in the construction in Figure 1, this male member $b$ has a piston-like head $b^2$ on which is secured a packing ring $c$ with its lips directed inwards of the chamber of the female part and towards the sealing liquid $e$ therein. The female part may be in halves or segments bolted together or may be in one piece. The manner in which the liquid $e$ acquires pressure for the tightening of the packing ring $c$ during submergence, has already been explained.

Joints constructed as hereinbefore described are suitable for deep diving armour suits or apparatus, such suits or apparatus being capable of submergence to depths far greater than those which can be reached with the ordinary diving suits. They need not be fitted, unless so desired, with auxiliary linkage connections of the pivotal or universal type, as they are self-sufficient for all the demands which may be made of them. They are strong, reliable and lasting and are easily taken apart for inspection or repair.

I claim:—

1. In a joint for apparatus subjected to external pressure, the combination with a female joint member formed as a chamber for reception of a sealing liquid, of a male joint member having an annular piston-like head and an annular packing fitted on said head and working over the internal surfaces of said chamber, for the purpose set forth.

2. In a joint for apparatus subjected to external pressure, the combination comprising a double-walled female member, a sealing liquid filling the chamber between said walls, a male member having a piston-like head extending into said chamber, and an annular packing fitted on said head and working over the internal surfaces of the chamber for the purpose set forth.

3. In a joint for apparatus subjected to external pressure, the combination with a double-walled female member forming an annular chamber for a charge of sealing liquid, of a male member fitted with an annular hydraulic packing of the U-leather variety working over the internal surfaces of said chamber for the purpose set forth.

4. In a joint for apparatus subjected to external pressure the combination with a double-walled female member forming an annular chamber for a charge of sealing liquid, of a male member formed with a piston-like head extending into said chamber, a hydraulic packing of the U-leather variety mounted on said head with its lips presented towards the charge of liquid in said chamber and working over the internal surfaces of the chamber, and a securing ring for fastening said packing ring on said head.

5. A spherical joint for apparatus subjected to external pressure, comprising in combination a double-walled female member in the form of a middle annular section of a sphere and having detachable wall parts, a charge of sealing liquid filling the chamber between the walls of said female member, a male member having an annular piston-like head extending into said chamber, and an annular packing ring fitted on said head and working over the internal surfaces of said chamber.

6. A spherical joint for apparatus subjected to external pressure comprising a double-walled female member in the form of a middle annular section of a sphere and having detachable outer-wall parts, a charge of sealing liquid in the chamber enclosed between the walls of said female member, a male member having an annular piston-like head extending into said chamber, and an annular packing fitted on said head and working over the surfaces of said chamber for the purpose set forth.

7. A spherical joint for apparatus subjected to external pressure comprising a double-walled female member in the form of a middle annular section of a sphere and having its outer wall composed of detachable segments, a charge of sealing liquid in the annular chamber enclosed between the walls of said female member, a male member having an annular piston-like head extending into said chamber, and an annular packing fitted on said head and working over the surfaces of said chamber for the purpose set forth.

8. A spherical joint for apparatus subjected to external pressure comprising a double-walled female member forming an annular chamber, a charge of sealing liquid in said chamber, a single wall male member formed with a thickened end extending into said chamber, a divided seating ring having an interlocking engagement with said thickened end, an annular packing, and a divided securing ring for fastening said packing ring to the seating ring.

9. A spherical joint for apparatus subjected to external pressure, comprising a double-walled female member in the form of a middle annular section of a sphere, a charge of liquid in the annular chamber enclosed between the walls of said female member, a male member having an annular piston-like head extending into said chamber, and an annular packing ring mounted on said head disposed approximately in a diametral plane of the part spherical female member for the purpose set forth.

10. A spherical joint for apparatus subjected to external pressure, comprising a double-walled female member in the form of a middle annular section of a sphere and having its inner wall detachable from the outer wall, a charge of sealing liquid in the annular chamber enclosed between said walls, a male member having an annular piston-like head extending into said chamber, and an annular packing ring mounted on said head and working against the internal surfaces of said chamber for the purpose set forth.

11. A spherical joint for apparatus subjected to external pressure comprising a double-walled female member having an outer wall formed with an inwardly projecting lip provided with a coned seating surface, and having a detachable inner wall formed with a coned surface for engaging said seating surface, a charge of sealing liquid in the annular chamber enclosed between said walls, a male member formed with an annular piston-like head extending into said chamber, and an annular packing ring mounted on said head and working against the internal surfaces of said chamber for the purpose set forth.

12. A spherical joint for apparatus subjected to external pressure comprising a double-walled female member having an outer wall formed with an inwardly projecting lip provided with an internal coned seating surface and having a detachable inner wall formed with an external coned surface for engaging said seating surface, a charge of sealing liquid in the annular chamber enclosed between said walls, a male member formed with a thickened end extending into said chamber, a divided seating ring having a half dovetail inter-locking engagement with said thickened end, an annular packing, and a divided securing ring for fastening said packing ring to the seating ring.

13. A spherical joint for apparatus subjected to external pressure comprising a double-walled female member, a sealing liquid filling the annular chamber between said walls, a male member having a piston-like head extending into said chamber, and a packing ring on said head provided with lips directed towards the sealing liquid and working against the internal surfaces of said chamber for the purpose set forth.

14. A spherical joint for apparatus subjected to external pressure comprising a double-walled female member in the form of a middle annular section of a sphere and having detachable wall parts, a sealing liquid filling the annular chamber between said walls, a male member having a piston-like head extending into said chamber, the full diameter of said head being greater than the full diameter across the mouth of said chamber, and a packing ring on said head provided with lips directed towards the sealing liquid and working against the internal surfaces of said chamber for the purpose set forth.

JOSEPH SALIM PERESS.